US007267462B2

(12) United States Patent
Cronin

(10) Patent No.: US 7,267,462 B2
(45) Date of Patent: Sep. 11, 2007

(54) LIGHT BAR DEFOGGER

(76) Inventor: Daniel Joseph Cronin, 11842 State Route 213, Toronto, OH (US) 43964

(*) Notice: Subject to any disclaimer, the term of this patent is extended or adjusted under 35 U.S.C. 154(b) by 140 days.

(21) Appl. No.: 11/149,010

(22) Filed: Jun. 9, 2005

(65) Prior Publication Data

US 2005/0276054 A1 Dec. 15, 2005

Related U.S. Application Data

(60) Provisional application No. 60/579,718, filed on Jun. 15, 2004.

(51) Int. Cl.
*B60Q 1/06* (2006.01)

(52) U.S. Cl. ...................... 362/373; 362/128; 362/136; 34/90

(58) Field of Classification Search ................ 362/373, 362/127, 128, 136–137, 547, 218, 264, 294, 362/345, 96; 34/523, 90; 392/411–416
See application file for complete search history.

(56) References Cited

U.S. PATENT DOCUMENTS

| | | | | | |
|---|---|---|---|---|---|
| 3,594,063 | A | | 7/1971 | Smillie | |
| 3,775,606 | A | * | 11/1973 | Bazell et al. | 362/552 |
| 3,786,233 | A | * | 1/1974 | Bumpus et al. | 392/416 |
| 4,483,664 | A | * | 11/1984 | Armbruster | 417/234 |
| 4,655,559 | A | | 4/1987 | Odell | |
| 4,665,472 | A | * | 5/1987 | Chang | 362/294 |
| 4,680,448 | A | * | 7/1987 | Fester | 392/356 |
| 4,832,475 | A | | 5/1989 | Daniels | |
| 5,093,769 | A | * | 3/1992 | Luntsford | 362/269 |
| 5,402,265 | A | | 3/1995 | Jahoda | |
| 5,467,423 | A | * | 11/1995 | Jakubowski | 392/379 |
| 5,731,569 | A | | 3/1998 | Crescenzo | |
| 5,993,027 | A | * | 11/1999 | Yamamoto et al. | 362/294 |

* cited by examiner

*Primary Examiner*—Renee Luebke
*Assistant Examiner*—Gunyoung T. Lee
(74) *Attorney, Agent, or Firm*—Raymond M. Galasso; David O. Simmons; Galasso & Associates, LP

(57) ABSTRACT

A lighting apparatus comprises a housing assembly, a light bulb socket and a forced air generation device. The housing assembly includes a light opening in a front wall thereof and an air delivery opening in a bottom wall thereof. The light bulb socket resides within the housing assembly and is attached to the housing assembly. A longitudinal centerline axis of the light bulb socket extends through the light bulb opening. The forced air generation device resides within the housing assembly and is attached to the housing assembly. The forced air generation device is configured for directing at least a portion of an air stream provided thereby through the air delivery opening.

11 Claims, 2 Drawing Sheets

LIGHT BAR DEFOGGER

CROSS REFERENCE TO RELATED APPLICATIONS

This patent application claims priority to co-pending U.S. Provisional Patent Application having Ser. No. 60/579,718, filed Jun. 15, 2004, entitled "Light Bar Defogger", having a common applicant herewith and being incorporated herein in its entirety by reference.

FIELD OF THE DISCLOSURE

The disclosures made herein relate generally to lighting fixtures and, more particularly, to lighting fixtures configured for providing forced air circulation.

BACKGROUND

Steam gathering on a bathroom mirror is a well-known situation. For example, showering in the vicinity of a bathroom mirror often results in condensation forming on a bathroom. Similarly, running hot water in a sink in a bathroom can result in condensation forming on the bathroom mirror.

Bathrooms often include a vent fan for extract stream from a bathroom, thus limiting the potential for moisture condensing on a bathroom mirror. However, even with such a bathroom vent fan in use, condensation sometimes still forms on the bathroom mirror due to factors such as location of the shower relative to the vent fan, ambient conditions, and/or the shear volume of steam generated by the shower.

Therefore, an apparatus that is configured specifically for limiting formation of condensation on a mirror in a bathroom and/or removing such condensation from the mirror and that overcomes limitations that conventional bathroom vent fans exhibit with respect to condensation forming on bathroom mirrors would be useful and advantageous.

SUMMARY OF THE DISCLOSURE

Embodiments of the present invention relate to the common problem of steam condensing on a bathroom mirror. More specifically, embodiments of the present invention are configured for directing one or more streams of air toward a bathroom mirror and for providing lighting functionality as is provided by a conventional wall-mounted lighting apparatus. The stream(s) of air precludes and/or provides for removal of condensed steam on a bathroom mirror. Accordingly, the present invention advantageously overcomes one or more limitations associated with conventional lighting assemblies that are configured for and intended for being mounted on a wall over a mirror in a bathroom.

In one embodiment of the present invention, a lighting apparatus comprises a housing assembly, a light bulb socket and a forced air generation device. The housing assembly includes a light opening in a front wall thereof and an air delivery opening in a bottom wall thereof. The light bulb socket resides within the housing assembly and is attached to the housing assembly. A longitudinal centerline axis of the light bulb socket extends through the light bulb opening. The forced air generation device resides within the housing assembly and is attached to the housing assembly. The forced air generation device is configured for directing at least a portion of an air stream provided thereby through the air delivery opening.

In another embodiment of the present invention, a lighting apparatus comprises a housing assembly, a light bulb socket and a forced air generation device. The light bulb socket resides within the housing assembly and is attached to the housing assembly. A longitudinal centerline axis of the light bulb socket extends in a first direction from a base of the light bulb socket. The forced air generation device resides within the housing assembly and is attached to the housing assembly. The forced air generation device is configured for directing an air stream provided thereby in a second direction. The second direction is one of generally perpendicular to the first direction and generally opposite the first direction.

In another embodiment of the present invention, a lighting apparatus comprises a housing assembly, a plurality of light bulb sockets, a plurality of forced air generation devices, a plurality of air delivery opening covers and a plurality of electrical plug receptacles. The housing assembly includes a plurality of light openings in a front wall thereof, a plurality of air delivery openings in a bottom wall thereof and at least one air inlet opening in at least one wall thereof. The front wall extends generally parallel with a mounting surface of the housing assembly. The bottom wall extends generally perpendicular to the mounting surface of the housing assembly. The plurality of light bulb sockets resides within the housing assembly and attached to the housing assembly. A longitudinal centerline axis of each one of the light bulb sockets extends through a respective one of the light bulb openings. The plurality of forced air generation devices resides within the housing assembly and is attached to the housing assembly. At least a portion of an air stream provided by each one of the forced air generation devices is directed through a respective one of the air delivery openings. The plurality of air delivery opening covers are attached to the housing assembly. Each one of the air delivery opening covers is provided over a respective one of the air delivery openings. Each one of the air delivery opening covers includes a plurality of air-directing passages extending therethrough. At least a portion of the air-directing passages of each one of the air delivery opening covers has side walls configured for substantially changing direction of the air stream. The plurality of electrical plug receptacles is attached to the housing assembly. A plug engagement face of each one of the electrical plug receptacles is accessible through a respective electrical plug receptacle opening in the housing assembly.

Turning now to specific aspects of the present invention, in at least one embodiment, a housing assembly includes a main body and a mounting plate, the light opening and the air delivery opening are in the main body and the light socket and the forced air generation device is attached to the mounting plate.

In at least one embodiment of the present invention, the housing assembly includes a main body and a mounting plate. The forced air generation device includes a fan motor and a fan blade attached to the fan motor. The fan motor is attached to the mounting plate and the fan blade is attached to the motor.

In at least one embodiment of the present invention, at least one air inlet opening in at least one wall of the housing assembly and an air inlet opening cover attached to the housing assembly over the air inlet opening.

In at least one embodiment of the present invention, a light bulb socket shroud is engaged between the housing assembly and the light bulb socket such that flow of air through the light opening is at least partially inhibited.

In at least one embodiment of the present invention, an air delivery opening cover is attached to the housing assembly over the air delivery opening.

In at least one embodiment of the present invention, the air delivery opening cover includes a plurality of air-directing passages extending therethrough and at least a portion of the air-directing passages of the air delivery opening cover has side walls configured for substantially changing direction of the air stream.

In at least one embodiment of the present invention, the air delivery opening cover is rotatably mounted within the air inlet opening.

In at least one embodiment of the present invention, an electrical plug receptacle is attached to the housing assembly and has a plug engagement face of the electrical plug receptacle that is accessible through a respective electrical plug receptacle opening in the housing assembly.

These and other objects, embodiments advantages and/or distinctions of the present invention will become readily apparent upon further review of the following specification, associated drawings and appended claims.

DETAILED DESCRIPTION OF THE DRAWING FIGURES

Figure 1:
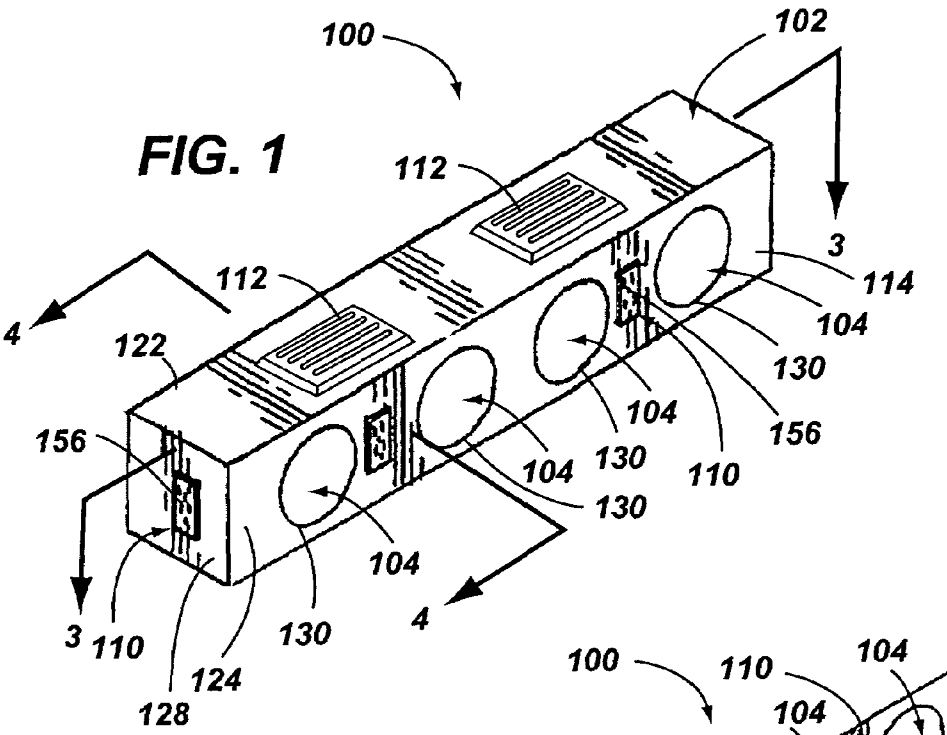
FIG. 1 depicts a top perspective view of a lighting apparatus in accordance with the present invention.
Figure 2:
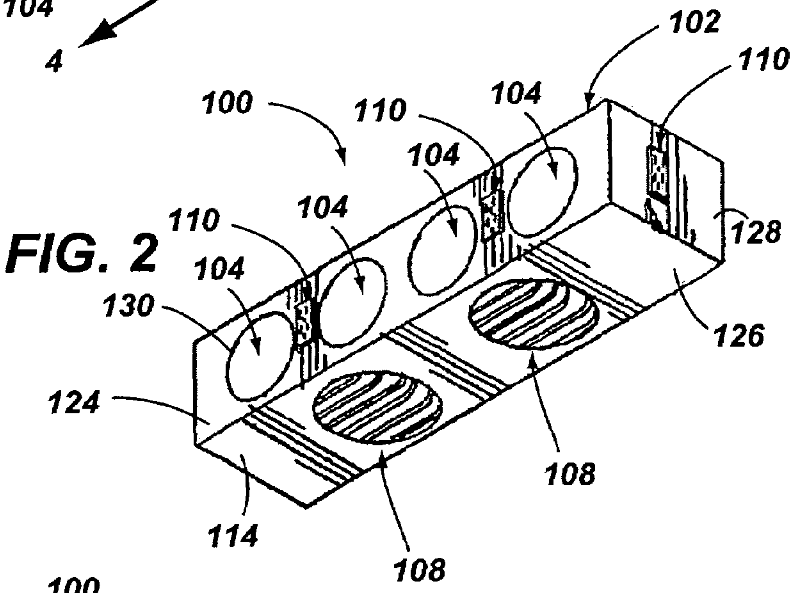
FIG. 2 depicts a bottom perspective view of the lighting apparatus depicted in FIG. 1.

FIGS. 1-4 depict a lighting apparatus in accordance with the present invention, which is referred to herein as the lighting apparatus 100. The lighting apparatus 100 is configured for directing one or more streams of air toward a bathroom mirror and for providing lighting functionality similar to that provided by a conventional wall-mounted lighting apparatus. The stream of air precludes and/or provides for removal of condensed steam on a mirror. Accordingly, the present invention advantageously overcomes one or more limitations associated with conventional lighting assemblies that are configured for and intended for being mounted on a wall over a mirror in a bathroom.

The lighting apparatus 100 includes a housing assembly 102, a plurality of light bulb socket assemblies 104, a plurality of forced air generation devices 106, a plurality of air delivery opening covers 108, a plurality of electrical plug receptacles 110 and a plurality of inlet air vents 112. As depicted in FIGS. 1-4, the lighting apparatus 100 includes a plurality of the light bulb socket assemblies 104, forced air generation devices 106, air delivery opening covers 108, electrical plug receptacles 110 and inlet air vents 112. Accordingly, the lighting apparatus 100 benefits from such plurality of functional components. However, in another embodiment of a lighting apparatus in accordance with the inventive disclosures made herein (not specifically shown), only a single one of at least one of such functional components is provided. For example, it is contemplated that a lighting apparatus in accordance with the present invention includes a single light bulb socket assembly 104, a single forced air generation device 106, a single air delivery opening cover 108, a single electrical plug receptacle 110 and a single inlet air vent 112.

Still referring to FIGS. 1-4, the housing assembly 102 includes a main body 114 and a mounting plate 116. The mounting plate 116 includes a mounting surface 118 through which the mounting plate 116 may be attached to a wall (i.e., a wall-mount plate). The mounting plate 116 includes flanges 120 through which the main body 114 is attached to the mounting plate 116. Examples of means for attaching the main body 114 to the flanges 120 include, but are not limited to, threaded fasteners, integral clips, discrete clips and mating integral engagement structures.

The main body 114 includes a top wall 122, a front wall 124, a bottom wall 126 and sidewalls 128. The walls (122-128) of the main body are configured such that the main body 114 has a substantially rectangular shape. Accordingly, the front wall 124 extends generally parallel with the mounting surface 118 of the mounting plate 116 and the bottom wall 126 extends generally perpendicular to the mounting surface 118 of the mounting plate 116. It is disclosed herein that a main body in accordance with the present invention need not necessarily have a rectangular shape and/or include all of the walls (122-128) comprised by the main body 114. For example, a main body in accordance with the present invention may have a cylindrical shape, an elongated annular shape, a wedge shape, etc. Accordingly, a skilled person will appreciate that a lighting apparatus in accordance with the present invention is not limited by a shape of its main body.

Figure 4:
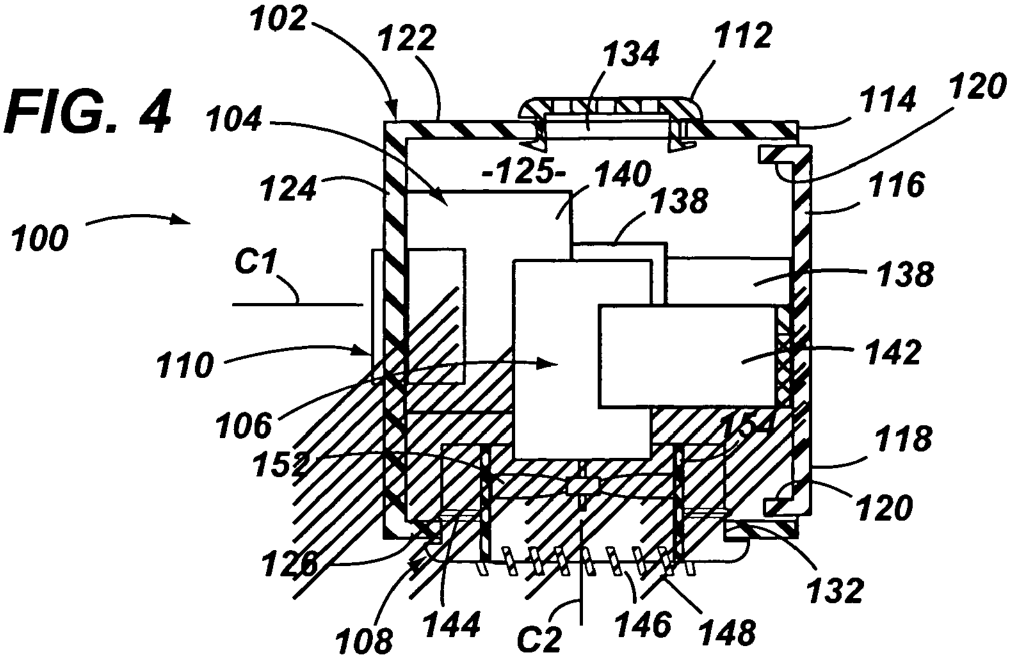
FIG. 4 is a cross sectional view taken along the line 4-4 in FIG. 1.

The main body 114 of the housing assembly 102 includes a plurality of light openings 130in the front wall 124 (FIGS. 1 and 2), a plurality of air delivery openings 132 in the bottom wall 126 (FIG. 4), and a plurality of air inlet openings 134 in the top wall 122 (FIG. 4). The light openings 130 are even spaced and are sized for having at least a base of a light bulb inserted therethrough. The air delivery openings 132 are generally aligned between two of the light openings 130. Preferably, but not necessarily, each one of the air inlet openings 134 are positioned generally above a respective one of the forced air generation devices 106. Alternatively, the air inlet openings 134 may be provided in the front wall 124, the bottom wall 126 and/or one or both of the sidewalls 128.

Figure 3:
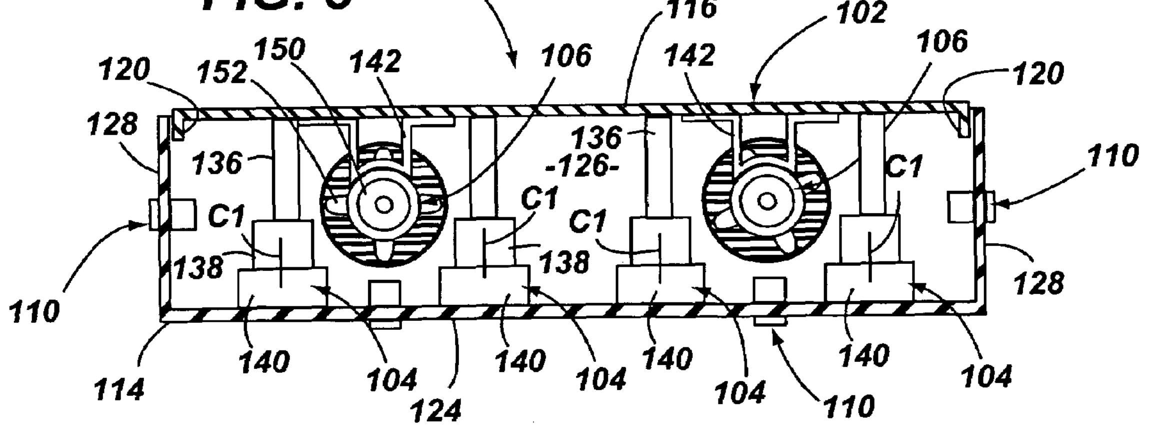
FIG. 3 is a cross sectional view taken along the line 3-3 in FIG. 1.

Each one of the light bulb socket assemblies 104 resides within the main body 114 and are attached to the backing plate 116 via one or more respective mounting brackets 136 (FIGS. 3 and 4). Each one of the light bulb socket assemblies 104 includes a light bulb socket 138 and a light bulb shroud 140. Alternatively, each light bulb shroud 140 may be attached to the main body 114 rather than to the backing plate 116 through the respective light bulb socket 138. A longitudinal centerline axis C1 of each one of the light bulb socket assemblies 104 extends in a first direction from abase of the light bulb socket through a respective one of the light bulb openings 130. Each light bulb shroud 140 is configured for and intended to limit heat from a light bulb entering the main body 114 and/or for limiting air being drawn by the forced air generation devices 106 into the main body 114. For example, the light bulb shroud 140 may be made from a heat insulating material, include heat reflecting material and/or have a seal with adjacent structures (e.g., a respective light bulb socket 138 and/or the main body 114).

The forced air generation devices 106 reside within the main body 114 and are attached to the backing plate 116 via one or more respective mounting brackets 142 (FIGS. 3 and 4). At least a portion of an air stream provided by each one of the forced air generation devices 106 is directed through a respective one of the air delivery openings 132. Each one of the forced air generation devices 106 is configured for directing the air stream provided thereby in direction that is generally perpendicular to the longitudinal centerline axis C1 of the light bulb socket assemblies 104.

Each one of the air delivery openings 132 has one of the air delivery opening covers 108 associated therewith. For example, as depicted, each one of the air delivery opening covers 108 is mounted within a respective one of the air delivery openings 132. Each one of the air delivery opening covers 108 includes a protrusion 144 that facilitates securing the respective one of the air delivery opening covers 108 in place. Preferably, but not necessarily, one or more of the air delivery opening covers 108 are mounted in a manner enabling rotation within the respective one of the air delivery openings 132.

Each one of the air delivery opening covers 108 includes a plurality of air-directing passages 146 (FIG. 4) extending therethrough. One or more of the air-directing passages 146 is at least partially defined by vanes 148 having sidewalls configured for substantially changing direction of the air stream. For example, the vanes 148 are angled with respect to a nominal air discharge direction of a respective one of the forced air generation devices 106.

As depicted in FIGS. 3 and 4, each one of the forced air generation devices 106 includes a fan motor 150 and a fan blade 152. The fan motor 150 is attached to the mounting plate 116 via the respective mounting bracket 142. The fan blade 152 of each one of the forced air generation devices 106 is positioned generally over a respective one of the air delivery openings 132. Preferably, but not necessarily, the fan blade 152 is located within a fan shroud to enhance airflow. In one embodiment (as depicted in FIG. 4), each one of the air delivery opening covers 132 includes a fan shroud 154 that extends in a manner enabling the fan blade 152 of a respective one of the forced air generation devices 106 to be positioned therein.

As will be appreciated by skilled person, a particular type of forced air generation device does not limit the present invention. For example, rather than being of the type shown in FIGS. 1-4, forced air generation devices of a lighting apparatus in accordance with the present invention may be of a blower type whereby a stream of air is discharges through an outlet of the blower device. In such an embodiment where a blower is implemented, an air directing cover may be attached to the blower device rather than to the housing assembly of the lighting apparatus.

It is disclosed herein that an air heating device may be implemented in conjunction with the forced air generation device such that the stream of air exiting from within the housing assembly is a stream of heated air. In one embodiment, an electrical heating element is provided between each fan blade 152 and the respective air delivery opening 132 such that an air stream provided by the fan blade 152 may be heated. In another embodiment, an air heating device is integral with a blower unit (e.g., a self contained unit including a means for creating a stream of air and an air heating device). The air heating device may be implemented in a manner enabling selective actuation such that a user has a choice of whether or not the stream of air is a stream of heated air.

Each one of the electrical plug receptacles 110 attached to the main body 114 of the housing assembly 102. A plug engagement face 156 of each one of the electrical plug receptacles 110 is accessible through a respective electrical plug receptacle opening in the main body 114. Conventional plug receptacles are examples of the electrical plug receptacles 110 depicted in FIGS. 1-4.

Figure 5:
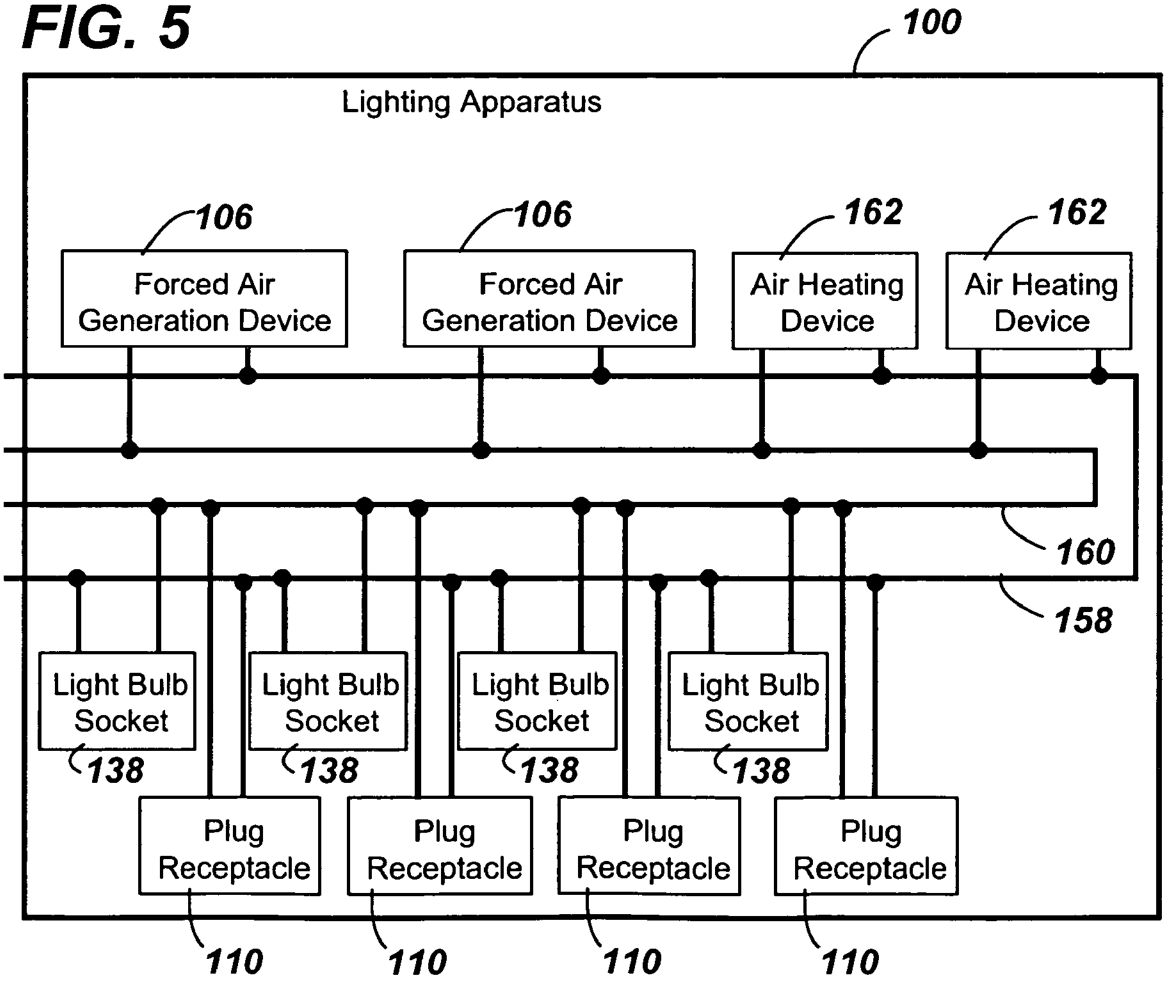
FIG. 5 depicts an electrical schematic for the lighting apparatus depicted in FIGS. 1-4.

FIG. 5 depicts an electrical schematic for the lighting apparatus 100 depicted in FIGS. 1-4. Each one of the light bulb sockets 138, the forced air generation devices 106 and the electrical plug receptacles 110 is electrically connected to a first harness conductor 158 (e.g., a hot-wire harness conductor) and to a second harness conductor 160 (e.g., a common-wire harness conductor). A plurality of electrical air heating devices 162 are attached to the first harness conductor 158 and to the second harness conductor 160.

Preferably, but not necessarily, the first harness conductor 158 and the second harness conductor 160 are configured for enabling the light bulb sockets 138, the forced air generation devices 106 and/or the air heating devices 162 to be separately or jointly energized. For example, as depicted in FIG. 5, the first harness conductor 158 and the second harness conductor 160 may each be a single piece of wire with the light bulb sockets 138, the forced air generation devices 106 and the air heating devices 162 connected in a manner (e.g., adjacent electrical connections) whereby severing of the first harness conductor 158 and/or the second harness conductor 160 at a location between grouped connection points of the forced air generation devices 106, the light bulb sockets 138 and/or the air heating devices 162 results in the light bulb sockets 138, the forced air generation devices 106 and/or the air heating devices 162 being electrically separated and, thus, connectable to separate wall switches for independent electrical activation.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes maybe made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A lighting apparatus, comprising:

a housing assembly including a light opening in a front wall thereof and an air delivery opening in a bottom wall thereof;

a light bulb socket residing within the housing assembly and attached to the housing assembly, wherein a longitudinal centerline axis of the light bulb socket extends through the light bulb opening;

a forced air generation device residing within the housing assembly and attached to the housing assembly, wherein the forced air generation device is configured for directing at least a portion of an air stream provided thereby through the air delivery opening; and an air delivery opening cover attached to the housing assembly over the air delivery opening, wherein the air delivery opening cover includes a plurality of air-directing passages extending therethrough and wherein at least a portion of said air-directing passages of the air delivery opening cover has side walls configured for substantially changing direction of the air stream and wherein the air delivery opening cover is rotatably mounted within the air inlet opening.

2. The lighting apparatus of claim 1 wherein:

the housing assembly includes a main body and a mounting plate;

the light opening and the air delivery opening are in the main body; and the light socket and the forced air generation device are attached to the mounting plate.

3. The lighting apparatus of claim 1 wherein:

the housing assembly includes a main body and a mounting plate;

the forced air generation device includes a fan motor and a fan blade;

the fan motor is attached to the mounting plate; and the fan blade is attached to the motor.

4. The lighting apparatus of claim 1, further comprising:

at least one air inlet opening in at least one wall of the housing assembly; and an air inlet opening cover attached to the housing assembly over the air inlet opening.

5. The lighting apparatus of claim 4, further comprising:

a light bulb socket shroud engaged between the housing assembly and the light bulb socket such that flow of air through the light opening is at least partially inhibited.

6. The lighting apparatus of claim 1 wherein:

the housing assembly includes a main body and a mounting plate;

the light opening and the air delivery opening are in the main body;

the light socket and the forced air generation device is attached to the mounting plate;

the forced air generation device includes a fan motor and a fan blade;

the fan motor is attached to the mounting plate;

the fan blade is attached to the motor; and the air inlet opening cover is rotatably mounted within the air inlet opening.

7. A lighting apparatus, comprising:

a housing assembly;

a light bulb socket residing within the housing assembly and attached to the housing assembly, wherein a longitudinal centerline axis of the light bulb socket extends in a first direction from a base of the light bulb socket; and a forced air generation device residing within the housing assembly and attached to the housing assembly, wherein the forced air generation device is configured for directing an air stream provided thereby in a second direction and wherein the second direction is one of generally perpendicular to the first direction and generally opposite the first direction;

an air delivery opening cover attached to the housing assembly over an air delivery opening in the housing assembly wherein the forced air generation device is configured for directing at least a portion of the air stream provided thereby through the air delivery opening; wherein the air delivery opening cover includes a plurality of air-directing passages extending therethrough and wherein at least a portion of said air-directing passages of the air delivery opening cover has side walls configured for substantially changing direction of the air stream; and wherein the air delivery opening cover is rotatably mounted within the air inlet opening.

8. The lighting apparatus of claim 7 wherein:

the housing assembly includes a main body and a mounting plate; and the light socket and the forced air generation device is attached to the mounting plate.

9. The lighting apparatus of claim 7 wherein:

the housing assembly includes a main body and a mounting plate;

the forced air generation device includes a fan motor and a fan blade;

the fan motor is attached to the mounting plate; and the fan blade is attached to the motor.

10. The lighting apparatus of claim 7, further comprising:

at least one air inlet opening in at least one wall of the housing assembly; and an air inlet opening cover attached to the housing assembly over the air inlet opening.

11. The lighting apparatus of claim 7 wherein:

the housing assembly includes a main body and a mounting plate;

the light socket and the forced air generation device is attached to the mounting plate;

the forced air generation device includes a fan motor and a fan blade;

the fan motor is attached to the mounting plate; and the fan blade is attached to the motor.

* * * * *